United States Patent [19]
Krolak et al.

[11] Patent Number: 6,138,209
[45] Date of Patent: Oct. 24, 2000

[54] DATA PROCESSING SYSTEM AND MULTI-WAY SET ASSOCIATIVE CACHE UTILIZING CLASS PREDICT DATA STRUCTURE AND METHOD THEREOF

[75] Inventors: David John Krolak, Dodge Center; Sheldon Bernard Levenstein, Rochester, both of Minn.

[73] Assignee: International Business Machines Corporation, Armonk, N.Y.

[21] Appl. No.: 08/924,272

[22] Filed: Sep. 5, 1997

[51] Int. Cl.[7] .................................................. G06F 12/00
[52] U.S. Cl. .......................... 711/128; 711/122; 711/204; 711/213; 711/137; 711/216
[58] Field of Search .................... 711/128, 213, 711/216, 122, 119, 123, 125, 126, 129, 138, 168, 203, 220, 221, 205, 202, 206, 207, 204, 137

[56] References Cited

U.S. PATENT DOCUMENTS

| | | | |
|---|---|---|---|
| 4,464,712 | 8/1984 | Fletcher | 364/200 |
| 4,797,814 | 1/1989 | Brenza | 364/200 |
| 5,014,195 | 5/1991 | Farrell et al. | 364/200 |
| 5,023,776 | 6/1991 | Gregor | 364/200 |
| 5,235,697 | 8/1993 | Steely | 711/128 |
| 5,392,414 | 2/1995 | Yung | 395/425 |
| 5,418,922 | 5/1995 | Liu | 395/425 |
| 5,530,832 | 6/1996 | So et al. | 395/449 |
| 5,564,035 | 10/1996 | Lai | 395/471 |
| 5,604,753 | 2/1997 | Bauer et al. | 371/40.1 |
| 5,611,071 | 3/1997 | Martinez, Jr. | 395/460 |
| 5,613,087 | 3/1997 | Chin et al. | 395/481 |
| 5,623,628 | 4/1997 | Brayton et al. | 395/468 |
| 5,717,892 | 2/1998 | Oldfield | 395/455 |
| 5,761,715 | 6/1998 | Takahashi | 711/128 |
| 5,860,104 | 1/1999 | Witt et al. | 711/137 |
| 5,918,245 | 6/1999 | Yung | 711/122 |

FOREIGN PATENT DOCUMENTS

| | | | |
|---|---|---|---|
| 0284751 | 10/1988 | European Pat. Off. | G06F 12/08 |
| 0581425 | 2/1994 | European Pat. Off. | G06F 12/08 |
| 0675443 | 10/1995 | European Pat. Off. | G06F 12/08 |
| 0795828 | 2/1997 | European Pat. Off. | 12/8 |
| 0795828 | 9/1997 | European Pat. Off. | G06F 12/08 |
| 2256512 | 6/1992 | United Kingdom | 12/8 |
| 9820420 | 11/1996 | WIPO | 12/8 |
| 9820421 | 11/1996 | WIPO | 12/8 |

OTHER PUBLICATIONS

Search results of Dialog Search in Files 351 and 347.
Liu, "Cache Designs with Partial Address Matching", *Computer Science Research Report 94A002323*, (Mar. 1994).
U.S. Patent application Ser. No. 08/873,785, *Multiway Associative External Microprocessor Cache*, filed on Jun. 12, 1997.

*Primary Examiner*—Eddie P. Chan
*Assistant Examiner*—Kimberly McLean
*Attorney, Agent, or Firm*—Scott A. Stinebruner

[57] ABSTRACT

A data processing system and method thereof utilize a unique cache architecture that performs class prediction in a multi-way set associative cache during either or both of handling a memory access request by an anterior cache and translating a memory access request to an addressing format compatible with the multi-way set associative cache. Class prediction may be performed using a class predict data structure with a plurality of predict array elements partitioned into sub-arrays that is accessed using a hashing algorithm to retrieve selected sub-arrays. In addition, a master/slave class predict architecture may be utilized to permit concurrent access to class predict information by multiple memory access request sources. Moreover, a cache may be configured to operate in multiple associativity modes by selectively utilizing either class predict information or address information related to a memory access request in the generation of an index into the cache data array.

47 Claims, 10 Drawing Sheets

DATA PROCESSING SYSTEM AND MULTI-WAY SET ASSOCIATIVE CACHE UTILIZING CLASS PREDICT DATA STRUCTURE AND METHOD THEREOF

FIELD OF THE INVENTION

The invention is generally related to memory caching in data processing systems such as computers and the like, and more particularly, to class prediction in a multi-way set associative cache.

BACKGROUND OF THE INVENTION

Users of data processing systems such as computers and the like continue to demand greater and greater performance from such systems for handling increasingly complex and difficult tasks. In addition, processing speed has increased much more quickly than that of main memory. As a result, cache memories, or caches, are often used in many such systems to increase performance in a relatively cost-effective manner.

A cache is typically a relatively faster memory that is coupled intermediate one or more processors and a relatively slower memory such as implemented in volatile or non-volatile memory devices, mass storage devices, and/or external network storage devices, among others. A cache speeds access by maintaining a copy of the information stored at selected memory addresses so that access requests to the selected memory addresses by a processor are handled by the cache. Whenever a access request is received for a memory address not stored in the cache, the cache typically retrieves the information from the memory and forwards the information to the processor. Moreover, if the cache is full, typically the information related to the least recently used memory addresses is returned to the memory to make room for information related to more recently accessed memory addresses.

The benefits of a cache are maximized whenever the number of access requests to cached memory addresses, known as "cache hits", are maximized relative to the number of access requests to non-cached memory addresses, known as "cache misses". Despite the added overhead that typically occurs as a result of a cache miss, as long as the percentage of cache hits is high, the overall access rate for the system is increased. It is well known that the vast majority of successive memory access requests refer to a relatively small address area, and thus, cache hit rates of well over 95% are common.

A cache directory is typically utilized by a cache controller to access cache lines that store information from given ranges of memory addresses. Such ranges of memory addresses in memory are typically mapped into one of a plurality of sets in a cache, where each set includes a cache directory entry and cache line referred to thereby. In addition, a tag stored in the cache directory entry for a set is used to determine whether there is a cache hit or miss for that set—that is, to verify whether the cache line in the set to which a particular memory address is mapped contains the information corresponding to that memory address.

Typically, both the set and the tag are derived directly from the memory address to reduce access time, as a hardwired mapping of specific address lines to the set and tag may be performed relatively quickly. For example, assuming a memory space of $2^n$ memory addresses, and thus [n-1:0] address lines, a cache line size of $2^m$ bytes, and $2^p$ sets, one common cache design maps the m lowest order address lines to a byte select for a given cache line, the next p lowest order address lines to the set, and the remaining address lines to the tag. The tag also includes the bits from the p set lines as well.

Caches may have different degrees of associativity, and are often referred to as being N-way set associative. Each "way" or class represents a separate directory entry and cache line for a given set in the cache directory.

Therefore, in a one-way set associative cache, each memory address is mapped to one directory entry and one cache line in the cache. However, this type of cache is typically prone to "hot spots" where multiple memory addresses from different cache pages that are accessed relatively frequently are mapped to the same directory entry in the cache, resulting in frequent cache misses and lower performance.

Multi-way set associative caches, e.g., four-way set associative caches, provide multiple directory entries and cache lines to which a particular memory address may be mapped, thereby decreasing the potential for performance-limiting hot spots. However, when each set includes multiple directory entries, additional processing time is typically required to determine which, if any, of the multiple directory entries in the set references that memory address. Typically, this is performed by either sequentially or concurrently comparing the tag for a given memory address with the tag for each directory entry in the set, and then accessing the cache line referred to by the matching directory entry if and when a match is found. Therefore, while hot spots are reduced in a conventional multi-way set associative cache, the performance gains are at least partially offset by the additional comparison step or steps required to determine the correct directory entry in a set.

Cache performance is also improved by increasing the size of the cache. However, cache memory is often relatively expensive, and oftentimes is limited by design constraints—particularly if the cache is integrated with a processor on the same integrated circuit device. Internal caches integrated with a processor are typically faster than external caches implemented in separate circuitry. On the other hand, due to design and cost restraints, internal caches are typically much smaller in size than their external counterparts. If a set associative cache is internal then all sets may often be accessed in parallel; however, this is often not possible with external set associative caches. In addition, internal multi-way set associative caches are often limited in size by the area of the chip.

One cost-effective alternative is to chain together multiple caches of varying speeds, with a relatively smaller, but faster primary cache chained to a relatively larger, but slower secondary cache. For example, some microprocessors implement a relatively small internal level one (L1) cache with an additional internal or external level two (L2) cache coupled intermediate the L1 cache and main memory storage.

In addition, some computer system designs utilize virtual addressing, and thus require address translation of a memory access request from a virtual addressing format to a real addressing format for access to a main memory. Moreover, the design of virtual addressed caches is often more complex than counterpart real addressed caches, and thus, real addressing is often used for many cache designs. Therefore, an additional step of translating a memory access request from virtual addressing to real addressing is also required for many cache accesses.

It may be possible to utilize class prediction algorithms to attempt to predict a correct class mapping for a particular memory address. For example, some conventional designs utilize a history array accessed by virtual address bits to control the late select of an internal level one cache without penalizing the cycle time of the cache. However, these designs are not well suited for external caches as they would require additional cycles, additional pins on the processor chip, and/or additional custom external arrays interfaced with the processor chip.

Consequently, a significant need continues to exist in the art for a cache design capable of increasing system performance in a data processing system. Specifically, a significant need continues to exist for a cost-effective cache design exhibiting greater hit rates and reduced access times relative to conventional designs.

SUMMARY OF THE INVENTION

The invention addresses these and other problems associated with the prior art in providing a data processing system and method thereof utilizing a unique cache architecture that performs class prediction in a multi-way set associative cache with little or no performance penalty. Consistent with one aspect of the invention, the cache architecture may be implemented in a multi-cache system, with class prediction for a second cache performed at least partially in parallel with handling of a memory access request by a first cache. Consistent with another aspect of the invention, the cache architecture may be implemented in a cache that utilizes a different addressing format from that of a memory access request source coupled thereto, with class prediction for the cache performed at least partially in parallel with address translation of a memory access request to the addressing format for the cache.

In either event, paralleling class prediction for a cache with such necessary preliminary operations therefor often significantly reduces any latency caused by class prediction and consequently increase the performance of a cache. For example, in various embodiments of the invention, class prediction for a cache may be completed prior to handling of a memory access request by the cache such that class prediction information is immediately available to the cache when the cache does assume responsibility for the request. Consequently, in such embodiments, the advantages of a multi-way set associative cache, e.g., increased hit rate and fewer hot spots, are obtained without the performance penalty typically associated with conventional multi-way cache designs.

Additional features may be implemented in various embodiments of the invention. For example, consistent with another aspect of the invention, a unique class predict architecture may be utilized including a class predict data structure with a plurality of predict array elements partitioned into sub-arrays that is accessed using a hashing algorithm to retrieve selected sub-arrays. As such, the class prediction data structure is less susceptible to hot spots.

Consistent with an additional aspect of the invention, a unique class predict architecture may be utilized including a master class predict data structure coupled to at least one slave predict data structure that maintains a copy of at least a portion of a plurality of predict entries from the master class predict data structure. Through this architecture, multiple memory access request sources can access class predict information in parallel with reduced latency and low susceptibility to conflicts.

Consistent with yet another aspect of the invention, a unique cache architecture may be configured to operate in multiple associativity modes. By selectively utilizing either class predict information or address information related to a memory access request in the generation of an index into the cache data array, cache lines in the cache data array may be associated with different numbers of classes. This permits, for example, a common hardware design to be utilized to implement multiple cache architectures, thereby lowering development, testing and manufacturing costs.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

DETAILED DESCRIPTION

Figure 1:
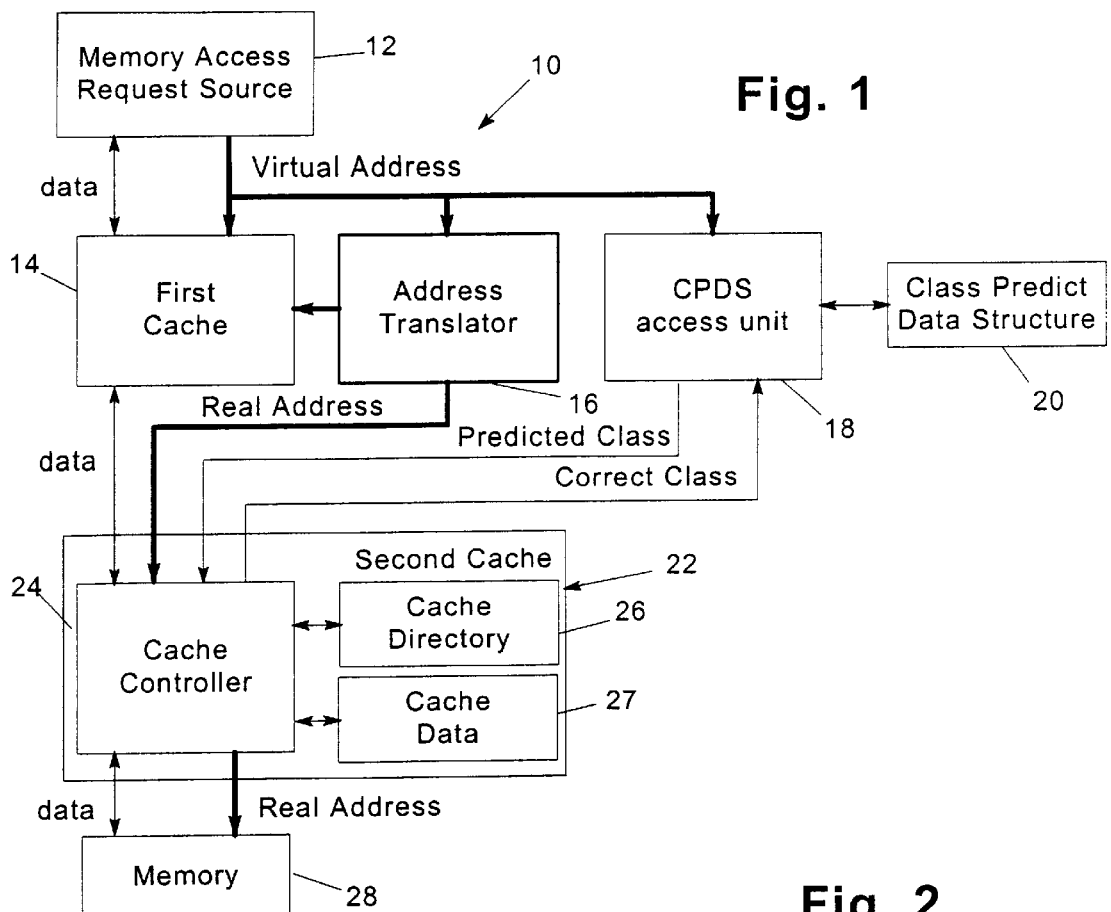
FIG. 1 is a block diagram of a data processing system consistent with the invention.

Turning to the Drawing wherein like numbers denote like parts throughout the several views, FIG. 1 illustrates the general configuration of an exemplary data processing system 10 that illustrates the basic operation of the various embodiments of the invention. System 10 generically represents any of a number of multi-user or stand-alone computer systems such as network servers, midrange computers, mainframe computers, workstations, desktop computers, portable computers, and the like. Data processing system 10 may also be implemented in other types of computing devices, e.g., in embedded controls for any number of electronically-controlled devices. One suitable implementation of data processing system 10 is in a midrange computer such as the AS/400 computer available from International Business Machines Corporation.

Data processing system 10 generally includes a memory access request source 12 which is coupled to a memory 28 through a pair of cache memories 14, 22. Memory access request source 12 may be any information processing unit that accesses information stored in a memory. For example, source 12 may be a processor core, or may be specifically an instruction fetch unit, a load/store unit, or other execution unit found in a processor. Other sources which may from time to time require access to an external memory may also be used.

Memory 28 is typically a bank of random access memory, although in the alternative, a memory may be implemented in local or mass storage devices such as hard disk drives, magnetic tapes, CD-ROMS, and a multitude of other storage media. For example, either or both of caches 14, 22 may be utilized to cache data stored in a hard disk drive storage array, or any other known cache applications.

First and second caches 14, 22 may be implemented, for example, as level one (L1) and level two (L2) caches. Each cache may be internal and implemented on the same integrated circuit device as the memory access request source; or may be external and implemented on a separate device from the memory access request source. Moreover, other caches may be interposed between source 12 and memory 28, so long as cache 14 is anterior or dominant to cache 22.

Second cache 22 generally includes a cache controller 24 coupled to a cache directory 26 and cache data array 27. Cache controller 24 operates as an access unit to the directory to determine a hit or miss to the cache. It should be appreciated that this configuration is generally representative of any cache, and accordingly, cache 14 may be similarly configured.

Data processing system 10 may also include an optional address translator 16 which translates between first and second addressing modes or schemes. In particular, many data processing systems utilize address translators to translate between virtual addressing and real addressing modes. This enables data processing systems to be designed to operate with different sizes and configurations of physical memories, as well as to accommodate for future expansion of the physical memory of the systems. Often in such systems, source 12 operates in a virtual addressing mode, while the physical memory 28 operates in a real addressing mode. As shown in FIG. 1, first cache 14 may also be addressed via virtual addressing, particularly if the cache is a high speed and highly integrated cache such as an internal L1 cache. The first cache may also be added by real addresses, or have a real address directory. It is typical for less integrated cache memories such as L2 caches to be addressed via real addressing, and consequently, address translator 16 converts memory access requests generated by source 12 into a real addressing mode for use by cache 22. In the alternative, a single addressing mode may be utilized, whereby address translator 16 would not be required.

Second cache 22 is configured as a multi-way set associative cache having N classes. Consequently, a set of N directory entries and N cache lines are mapped to each memory address. A class predict data structure (CPDS) 20 generally stores the predicted class for a given memory address consistent with the invention. The data structure may be organized into any suitable organization such as an array, a list, a table, etc. For example, one preferred implementation of class predict data structure 20 is a table of sub-arrays accessed via a hashing algorithm that minimizes hot spots. In the alternative, the table of sub-arrays may also be directly mapped, whereby no hashing algorithm is used.

Class predict data structure 20 is accessed via a class predict data structure access unit 18 that outputs a predicted class to the second cache 22. It should be appreciated that access unit 18 implements suitable logic for retrieving class predict information depending upon the particular implementation of class predict data structure 20. For a hash table data structure, for example, access unit 18 may utilize a hashing algorithm to select one of a plurality of predict table entries based upon a portion of the bits in the selected memory address. Another portion of the bits in the memory address may then be used to select a specific array element in the selected entry. An access unit may utilize state logic to access data structure 20; however, faster performance is typically obtained through a hard-wired logic arrangement.

Memory access requests are handled by data processing system 10 in response to a memory access request issued by source 12. The request is typically handled first by first cache 14. If the request cannot be handled by first cache 14, the request is then forwarded to second cache 22 for processing. Similarly, if second cache 22 cannot handle the request, the request is forward to system memory 28, and typically the first and second caches are updated to cache in the requested information from memory 28.

Consistent with the invention, access unit 18 operates in parallel with either or both of cache 14 and address translator 16 such that predicted class information is available to second cache 22 at such time that cache 22 initiates handling of a memory access request. It should be appreciated that if a single addressing mode is used, no address translator is used, so access unit 18 operates solely in parallel with first cache 14. In contrast, it should also be appreciated that access unit 18 may also be utilized in other caches, e.g., even in an L1 cache, and may operate solely in parallel with the address translator, and not necessarily in parallel with another cache. In the embodiment illustrated in FIG. 1, however, access unit 18 operates in parallel with both first cache 14 and address translator 16.

Regardless of what access unit 18 operates in parallel with, however, access unit 18 initiates an access to the class predict data structure during the time in which such other units are executing. Typically, this results in retrieval of the class predict information prior to handling of the memory access request by the second cache. Accordingly, class prediction is typically performed without utilizing any additional cycles, and thus, the performance drawbacks of conventional multi-way set associative caches are avoided. Consequently, a greater hit rate, and less hot spots, may be provided in a cache architecture with a comparable access speed to a one-way set associative cache. The head start provided by this mechanism eliminates the access penalty relative to conventional designs.

Several additional functions may be implemented in data processing systems consistent with the invention. For example, a cache may be configurable between multiple associativities. In particular, a cache controller may be configured to generate a multi-bit index into a data array for the cache. Depending upon a mode signal, the controller can set one or more bits in the index to either the values of one or more bits from the predicted class information, or from one or more address bits in the selected memory address for the memory access request. This enables the cache to be configured to operate between two or more associativity operating modes. For example, to configure a cache to operate as a four-way set associative cache, the class predict data structure may be configured to output two bits of class predict information to select one of four classes. To reconfigure the cache as a one-way set associative cache, the two class predict bits utilized in generating the index to the data array may be replaced with address bits from the selected memory address for the memory access request.

A significant advantage of a reconfigurable cache is that the same general hardware design may be utilized for different configurations of cache memories. Consequently, the added cost, design time and debugging time that would otherwise be required to manufactured a new cache based upon a previous design is otherwise eliminated.

Figure 2:
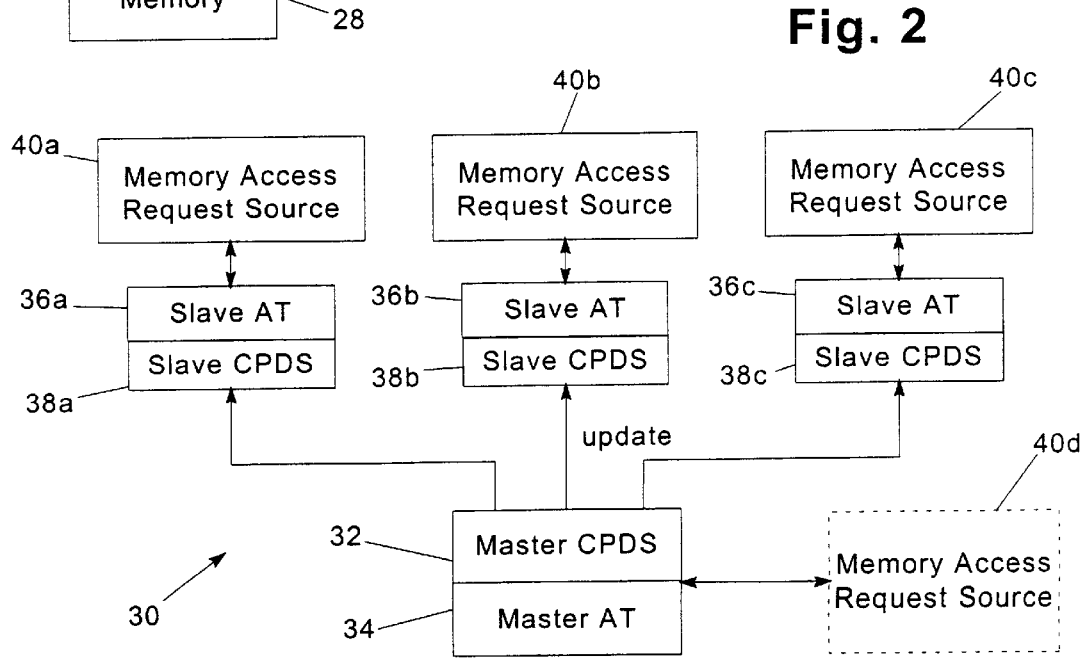
FIG. 2 is a block diagram of another data processing system utilizing master and slave class predict data structures consistent with the invention.

Another function which may be implemented in data processing systems consistent with the invention is a master/slave class predict data structure architecture as illustrated by data processing system 30 of FIG. 2. It should be appreciated that in high speed designs, data structures such as tables and arrays typically only have one access port—that is, such data structures may only be accessed by one source at a time. When multiple request sources desire to access the same data structure, additional state logic may be required to handle conflicts between the sources. Moreover, when one source is accessing the data structure, other sources must typically halt execution until access to such data structures is granted. Class predict data structures consistent with the invention often must be accessed within a short time frame, e.g., as little as one clock cycle, since address translation and/or first level cache access may be completed in this time. Consequently, any conflicts which interrupt access to a class predict data structure can significantly impact the performance of the cache.

Consistent with the invention, a master/slave data structure may be utilized to permit multiple sources, e.g., memory access request sources 40*a*–40*d*, to concurrently access class predict information.

Memory access request sources 40*a*–40*d* may generally represent any processing unit that requires access to a class predict data structure, such as an instruction fetch unit, a load/store unit, etc. As also shown in FIG. 2, such units may also have associated therewith dedicated address translation units such as address translation units 34 and 38*a*–38*c*. Moreover, the address translation units may also be organized in a master/slave relationship as is well known in the art.

A master class predict data structure 32 is utilized to maintain a full copy of all class predict information. Data structure 32 may have an access port to be utilized by a memory access request source such as source 40*d*. In the alternative, data structure 32 may not be accessible by an external source, and may serve merely as a data storage for the class predict information.

A plurality of slave class predict data structures 36*a*–36*c* are coupled to master data structure 32. Data structures 36*a*–36*c* have dedicated access ports to permit access thereto by memory access request sources 40*a*–40*c*, respectively. Each slave data structure contains a read-only copy of all or a portion of the class predict information in the master class predict data structure. Preferably, such data structures are read-only with respect to their associated sources, and may be updated only by master class predict data structure 32. Updating may be performed, for example, in response to an update of the corresponding information in the master class predict data structure, e.g., as a result of a class predict miss or cache miss. In such cases, the master class predict data structure, as well as any slave class predict data structures containing corresponding information, is updated with the correct class as determined by cache controller 24.

In some applications an entire page worth of class predict information may be copied from the master unit to a slave unit coincident with a slave translation miss. Any subsequent access to that page by the slave unit will also access the copied class predict information. Other features and functions implemented in data processing systems consistent with the invention will become apparent from the various embodiments described hereinafter.

Exemplary Hardware Implementation

Figure 3:
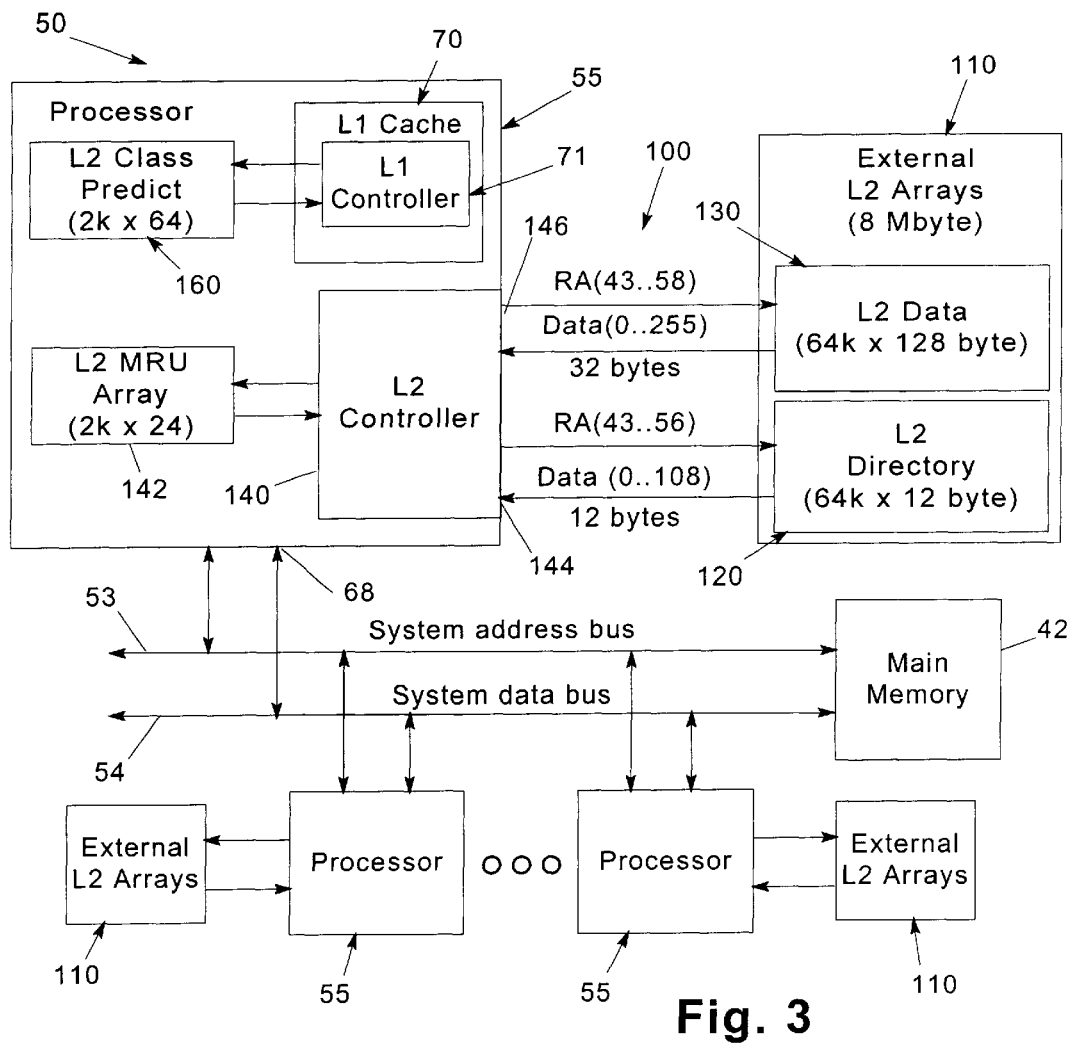
FIG. 3 is a block diagram of a multi-processor data processing system consistent with the invention.

FIG. 3 illustrates one exemplary embodiment of the invention implemented as a multi-processor data processing system 50. System 50 includes a plurality of processors 55 coupled to a memory 42 over a system bus including an address bus 53 and data bus 54. Each processor 55 may be, for example, implemented on a single integrated circuit device. Moreover, each processor 55 may implement any number of core architectures, e.g., the power PC architecture developed by International Business Machines Corporation and Motorola. It should be appreciated that various components described hereinafter may be allocated to different integrated circuits or other hardware components, or may be integrated into the same integrated circuit chip as processor 55.

Processor 55 includes a high speed internal L1 cache 70 including an L1 controller 71 that controls access to the cache data. L1 cache 70 may implement any known cache designs, and the particular implementation thereof is not necessary for a full understanding of the invention. For example, the L1 cache may be partitioned into independent instruction and data caches, with controller 71 being implemented in two separate processing units which separately handle each cache. In the illustrated embodiment, L1 cache 70 is implemented to include a 64 KB one-way set associative instruction cache and a 64 KB two-way set associative data cache, each having 128 byte cache lines. However, it should be appreciated that other cache sizes and/or architectures may be used in the alternative.

An L2 cache 100 is also provided for each processor 55 and data processing system 50. Cache 100 includes an internal cache controller 140 that interfaces with a pair of external arrays 110 including a cache directory 120 and a data array 130.

Directory 120 in the illustrated embodiment has 64K entries, each with 12 bytes (108 bits) of information. When configured as a four-way set associative cache, 16 K directory entry sets are provided in directory 120. Data array 130 in the illustrated embodiment is implemented as an 8 MB array having 64K cache lines, each with 128 bytes of information.

Arrays 110 may be implemented, for example, in high speed static random access memory devices (SRAM's) and may be accessed via real addressing. In the alternative, either or both of directory 120 and data array 130 may be implemented internally. However, it should be appreciated that an internal implementation of the directories and data arrays may be subject to more stringent capacity limitations due to design constraints imposed on an integrated circuit device. The use of external arrays has been found to be advantageous in that relatively lower cost, or even commodity, memory devices may be utilized to implement the arrays, and moreover, the size of the cache can be significantly larger than could even be provided internally on the processor integrated circuit.

Controller 140 couples to arrays 120, 130 through ports 144, 146. A 32 byte-wide dedicated data bus is implemented between controller 140 and data array 130, while a 12 byte-wide dedicated data bus interfaces controller 140 with directory 120. Directory entry sets may therefore be retrieved in a single access, while the 128 byte-wide cache lines may be retrieved from data array 130 in four access cycles.

Controller 140 is preferably implemented internally on the processor, with a most-recently used (MRU) array 142 coupled thereto and internal to processor 55. Among other functions, controller 140 functions as an access unit that accesses the cache directory to determine a cache hit or miss for the selected memory address of a memory access request. This function may alternately be handled by separate processing units defined either internal or external to processor 55.

A class predict data structure 160 is also internally implemented on processor 55, however, as will be described below, the access unit for retrieving class predict information from data structure 160 is implemented in L1 controller 71. It should be appreciated that any of controller 140, MRU array 142, and class predict data structure 160 may be implemented external to the processor; however, typically such external implementations would offer lower performance than comparable internally-implemented designs.

MRU array 142 is utilized to determine which cache lines to cache out in response to a cache miss to the L2 cache. The operation and configuration of an MRU array is well known in the art and will not be discussed further herein. In the illustrated embodiment, MRU array 142 is implemented with 2K 24-bit entries that are multiplexed to form 16K entries, each with 3 bits of MRU information—one entry for each set of directory entries in the L2 directory. Other sizes and configurations of MRU arrays may be used in the alternative.

It should be appreciated that, in general, the configuration, capacities and arrangement of the various hardware components used to implement the caches, tables and arrays in the data processing system may vary from those described herein. Therefore, the invention should not be limited to any particular hardware implementation.

Figure 4A:
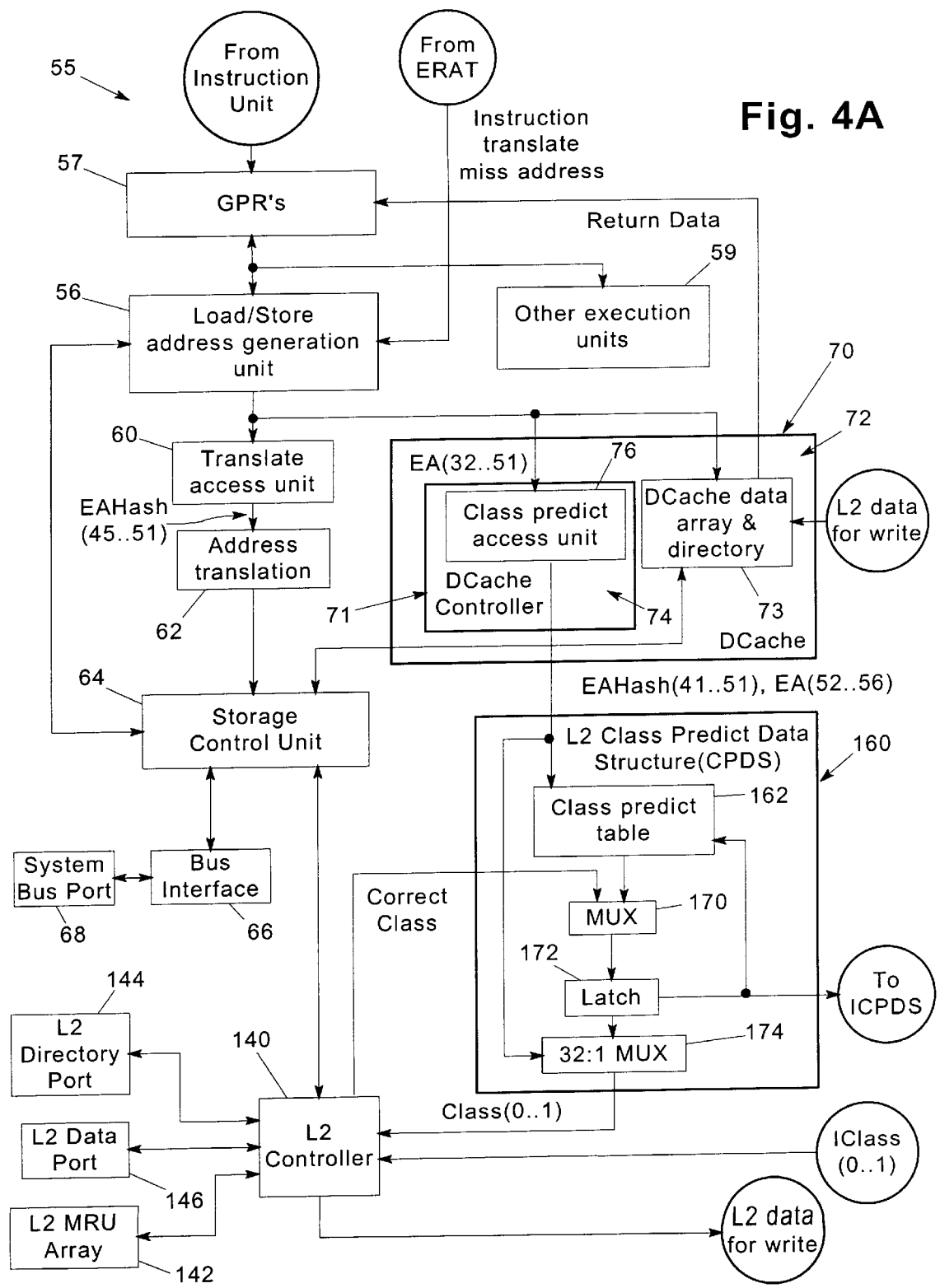
FIGS. 4A and 4B are block diagrams respectively illustrating data and instruction handling components of one of the processors of FIG. 3.
Figure 4B:
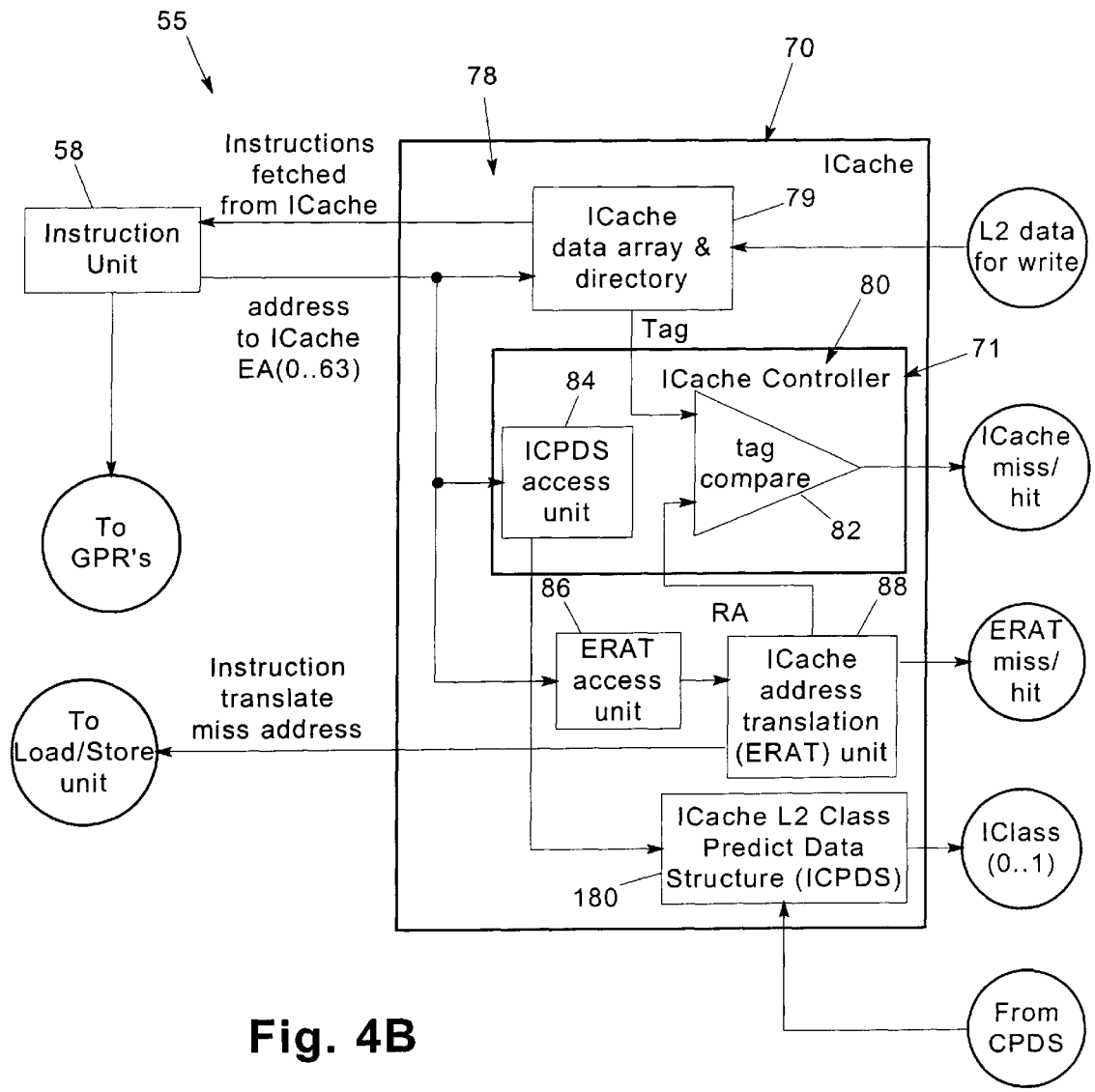

The principal components handling the data and instruction handling functions of processor 55 are respectively illustrated in greater detail in FIGS. 4A and 4B. Moreover, as described above, L1 cache 70 is partitioned into separate data and instruction caches 72, 78 (also referred to as DCache and ICache) each having a separate dedicated controller 74, 80. It should be appreciated that a significant number of other components are present on processor 55 but are not relevant for a complete understanding of the invention. Such other components will therefore not be described in further detail herein.

Turning to FIG. 4A, the principle data handling components from processor 55 are controlled via a load/store address generation unit illustrated at 56. Unit 56 provides data transfer to several general purpose registers (GPR's) illustrated at block 57. General purpose registers 57 are loaded by means of data cache 70, and moreover, are addressed via an instruction fetch unit 58 (FIG. 4B). Other execution units, represented at block 59, may also be utilized to handle data operations in processor 55, e.g., other load/store units, floating point units, integer units, etc.

A translate access unit 60 receives a memory access request from load/store unit 56 for a selected memory address in a virtual addressing mode, herein referred to as an effective address (EA). Access unit 60 supplies the memory access request to address translation unit 62 to convert the effective address to a real address. In the illustrated embodiment, 64-bit effective and real addresses are requested in memory access requests, although typically only 40 of the 64 bits in the real address are used. Access unit 60 typically incorporates a hashing algorithm to minimize hot spots into the address translation unit 62. For example, address translation unit 62 may include 128×4 entries, accessed via a 7-bit index represented by EAHash (45 . . . 51). The hashing algorithm may be, for example, EA (36 . . . 39) XOR EA (45 . . . 48) ∥ EA (49 . . . 51). Other hashing algorithms may be used in the alternative. Moreover, it should be appreciated that the general operation and configuration of an address translation unit is well known in the art and therefore need not be described in greater detail herein.

Address translation unit 62 outputs the selected memory address for the memory access request in a real addressing format to a storage control unit 64. Storage control unit 64 provides an interface to main memory through a bus interface 66 and bus port 68. Moreover, storage control unit 64 interfaces to L2 controller 140, as well as to the data array in block 73 of data cache 72. Controller 140 is shown coupled to MRU array 142 as well as to directory and data ports 144, 146 through which controller 140 interfaces respectively with directory 120 and data array 130.

Data cache 72 includes a data array and cache directory illustrated at 73, as well as a controller 74 which handles the access, updating, snooping, etc. functions for the data cache in a manner well known in the art. Moreover, consistent with the invention, the cache controller also implements a class predict access unit 76 that controls the class predict data structure to output predicted class information for the selected memory address specified in the memory access request. Class predict access unit 76 receives the memory access request as an effective address, so it is permitted to operate in parallel with address translation unit 62 as well as while the memory access request is handled by the data cache. In the illustrated embodiment, both class predict data structure 160 and class predict access unit 76 are disposed on the integrated circuit in close proximity to the data cache and the load/store unit to minimize any delays therebetween and thereby ensure that class predict information is immediately available to the L2 cache should a L1 class miss be detected. It should be appreciated that access unit 76 and class predict data structure 160 could be implemented externally or implemented within the L2 controller or a separate execution unit if desired. However, the performance thereof may be adversely impacted.

Class predict data structure 160 is preferably implemented in the illustrated embodiment as using a 2K×64-bit class predict table 162. Each entry in class predict table 162 forms a sub-array having 32 two-bit array elements. The two bits in each element select any of four classes 0–3. The size of the class predict array determines the number of class predict misses, and thus, the larger the size, the better. In some applications, the array may have more entries than the L2 cache.

Class predict table 162 outputs a 64-bit entry to a multiplexer 170 which normally passes an entry straight through to a latch 172 that stores the entry. However, in response to a class predict miss, controller 140 is configured to utilize multiplexer 170 to replace an incorrect class predict array element with the correct class information. Latch 172 is also configured to be controlled by controller 140 to output the corrected entry back to class predict table 162 and thereby re-write the entry in the table.

The current contents of the latch 172 are also provided to a second multiplexer 174 that selects one of the 32 array elements in the entry based upon a select signal provided by class predict access unit 76. Multiplexer 174 may be implemented using two bit wide 32:1 multiplexing logic. The output of the multiplexer is a 2-bit predicted class value that is provided to controller 140.

Figure 5:
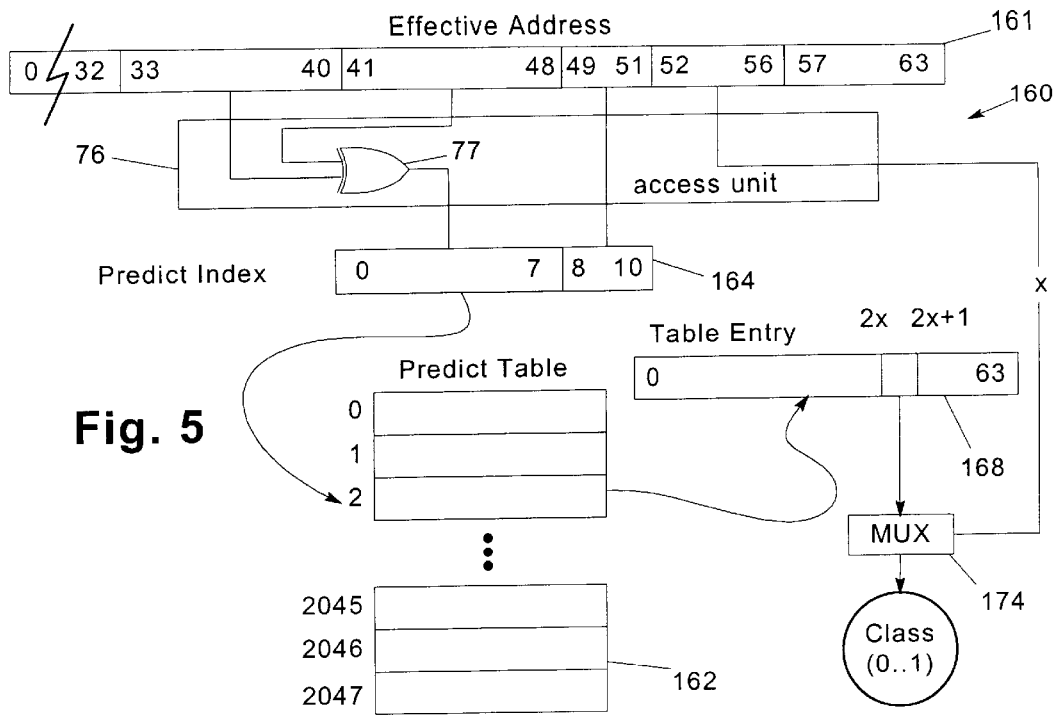
FIG. 5 is a block diagram illustrating the retrieval of predicted class information from the class predict data structure of FIG. 3.

FIG. 5 generally illustrates one preferred configuration of the class predict data structure, as well as the manner by which such a data structure is accessed. Each array element in class predict data structure 160 corresponds to one 128 byte cache line in data array 120. Consequently, each table entry 168 in table 162 corresponds to 4 KB in the virtual address space, referred to as a 4K page. Being organized in 4 KB groups to match the 4 KB page size allows the slave class predict scheme to copy all 32 entries when there is a slave translate miss.

Access unit 76 receives the effective address for the memory access request at 161 from load/store unit 56. A hash mechanism within access unit 76 generates a predict index 164 to access one of the entries in predict table 162. One preferred implementation of the hash mechanism utilizes a hashing algorithm whereby bits 33–40 of the effective address are exclusive ORed with bits 41–48 as represented by logic gate 77 to generate the eight most significant bits (MSB's) of the index. The three least significant bits (LSB's) of the index are mapped to bits 49–51 of the effective address. It should be appreciated, however, that other hashing algorithms may be used in the alternative. Moreover, a direct mapping between the effective address and the predict index may also be used, albeit with a greater risk of hot spots.

Access unit 76 also outputs a 5-bit multiplexer control signal x, (x=0–31) to a multiplexer 174. The multiplexer control signal is directly mapped to bits 52–56 of the effective address. The multiplexer control signal selects one of thirty-two array elements (located at bits 2x and 2x+1) in the table entry 168, resulting in a 2-bit predicted class output from the multiplexer. It should be appreciated, however, that other data structures and manners of accessing the same may used in the alternative.

Returning to FIG. 4B, the principle instruction handling components for processor 55 are illustrated. In general, processor 55 includes an instruction unit 58 which provides a memory access request (or fetch) to an instruction cache 78 in an effective addressing mode. It should be appreciated that instruction unit 58 may include any number of implementations, including pipelined, multi-threading, etc. Moreover, multiple instruction units may also be provided, each having a dedicated instruction cache therefor. Other instruction fetch architectures may also be used in the alternative.

Instruction cache 78 includes data and directory arrays 79, as well as a controller 80 which handles the functions of accessing, updating, snooping, etc. for the instruction cache in a manner that is well known in the art. Among these functions, a tag compare block 82 is illustrated to indicate the output of an instruction cache miss or hit that is subsequently used by the L2 cache to determine when the L2 cache must handle the memory access request. In general, an instruction cache hit is determined when a tag for the cache directory entry corresponding to the memory access request matches a subset of bits from the memory access request, as is well known in the art.

Instruction cache 78 also includes a slave address translation unit 88 which is accessed through an access unit 86. Address translation unit 88 is also referred to herein as an effective to real address translation (ERAT) unit. ERAT unit 88 maintains a portion of the translate entries in the master address translation unit 62 to provide higher speed access for instruction cache 78. ERAT unit 88 outputs a real address to controller 80 for comparison with the tag in the directory entry, as well as an ERAT miss/hit signal to the L2 controller to indicate when a miss occurs in the address translation unit. In addition, an instruction translate miss address is passed to the load/store unit when an ERAT miss occurs so that the ERAT unit can be updated by the load/store unit. The use of a master/slave translation unit architecture is well known in the art, and therefore will not be further described herein.

Instruction cache controller 80 also is shown implementing an instruction class predict data structure (ICPDS) access unit 84 for accessing a slave class predict data structure (ICPDS) 180. ICPDS 180 in the illustrated embodiment includes 32 two-bit entries (one 4 KB page worth) of class predict for each entry in the instruction ERAT table. This array is updated on all ERAT misses from 64 bits of the master L2 class predict array and is also updated when a class predict miss occurs for an instruction fetch, and when an L2 miss occurs for an instruction fetch.

Other implementations of an instruction cache may also be used in the alternative. Moreover, as described above, a single L1 cache may be used in lieu of separate instruction and data caches.

Figure 6:
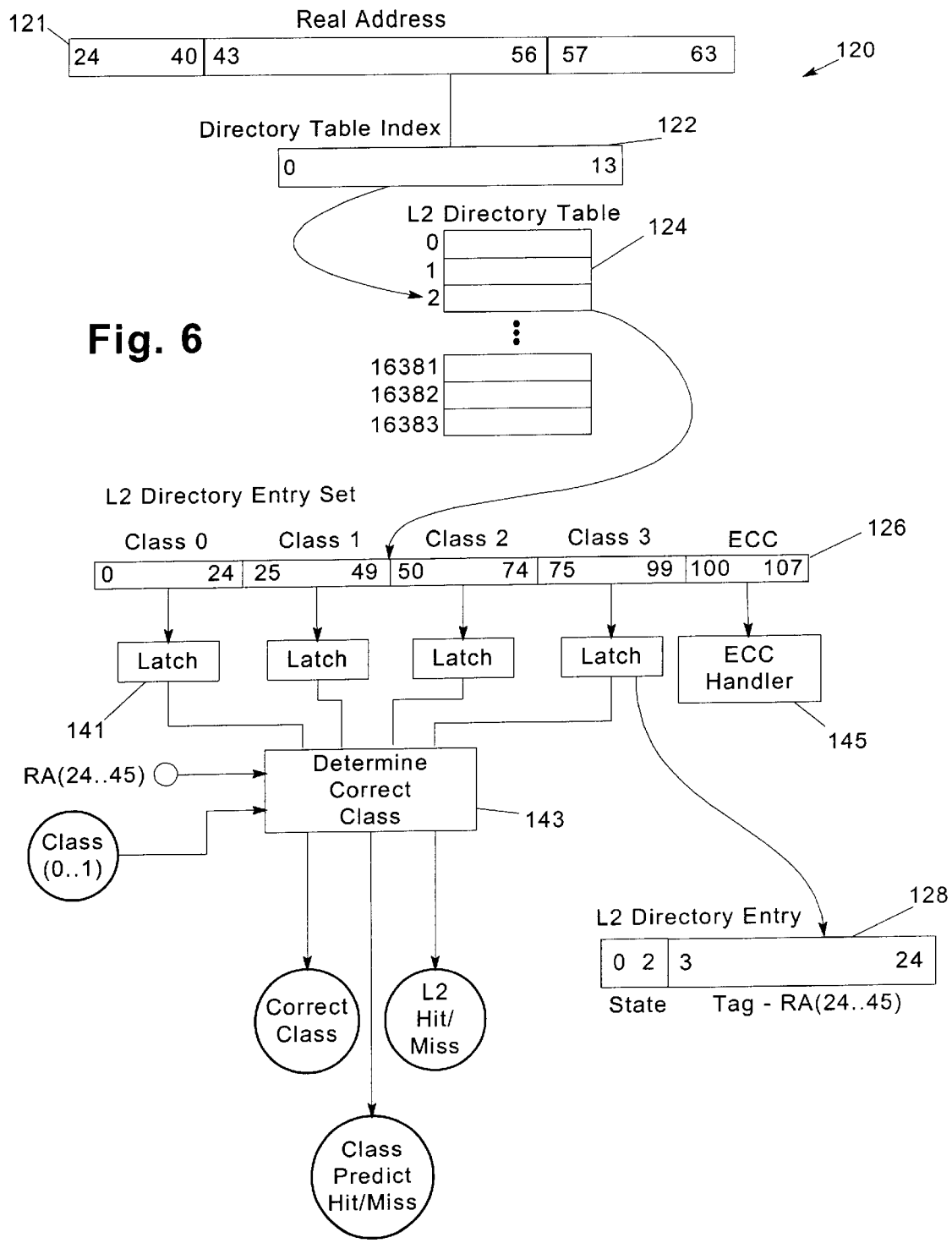
FIG. 6 is a block diagram illustrating the retrieval of a directory entry from the L2 cache of FIG. 3.

The manner of accessing data array 120 with controller 140 is generally illustrated in FIG. 6. Starting with the selected real-mode memory address 121 output from address translation unit 62, a 14-bit directory table index 122 is generated from bits 43–56 of the real address. Index 122 is used to retrieve a directory entry set 126 from a directory table 124. Each entry set 126 is 12 bytes wide, and includes four directory entries as well as optional error correcting code (ECC) data that is handled by a conventional ECC handler as shown at block 145. A directory entry set 126 is partitioned as follows:

| BITS      | DESCRIPTION   |
|-----------|---------------|
| 0 . . . 24   | Class 0 Entry |
| 25 . . . 49  | Class 1 Entry |
| 50 . . . 74  | Class 2 Entry |
| 75 . . . 99  | Class 3 Entry |
| 100 . . . 107 | ECC           |

A directory entry is illustrated at 128, including the three MSB's defined as state bits, and the twenty-two LSB's defined as the tag. The three state bits indicate the following states:

| BITS | DESCRIPTION            |
|------|------------------------|
| 000  | Invalid (Empty)        |
| 001  | Fill Pending           |
| 010  | Data Error (Deallocated) |
| 011  | Tag Error (Deallocated)  |
| 100  | Exclusive              |
| 101  | Modified               |
| 110  | Shared                 |
| 111  | Owner                  |

It should be appreciated that the first four entries generally represent directory entries that do not have valid data stored in their associated cache lines while the last four states indicate valid data associated therewith. The "Owner" state is similar to the "Shared" state, with the additional indication that the cache was the last unit to access the block of memory. The use of the various state bits is well known in the art, and therefore will not be discussed in greater detail herein.

The tag provided in each directory entry is typically mapped to a number of bits in the real address, e.g., bits 24–45. Consequently, by comparing the corresponding bits from the real address for the memory access request with the tags, a matching directory entry may be determined.

Each directory entry in set 126 typically latched concurrently, e.g., using latches 141. The latches are accessible by using controller 140 to retrieve the state and tag information therefrom. The contents of the latches are also passed to a determine correct class block 143 which compares each entry to the real address for the memory access request. In the illustrated embodiment, all the entries are concurrently compared to the real address, and moreover, all the states of the entries are polled to determine which, if any, of the entries represents a valid cached data for the memory access request ("L2 hit"). Block 143 outputs a correct class signal corresponding to the valid cache line for the selected memory address, as well as an L2 hit/miss signal that indicates a hit whenever any directory entry is valid and matching the tag. In addition, the predicted class information may also be provided to block 143 and compared to the correct class to determine whether the class predict information is correct (a "class predict hit"). The use of these signals in handling accesses and updates to the L2 cache will be described in greater detail below.

Figure 7:
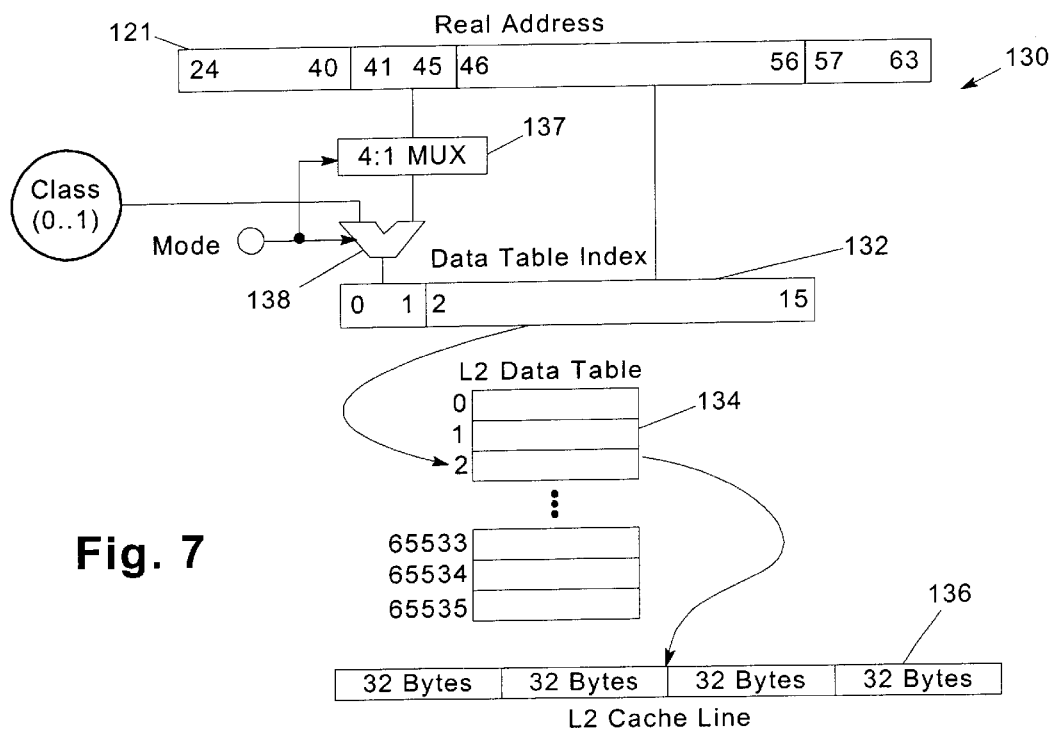
FIG. 7 is a block diagram illustrating the retrieval of a cache line from the L2 cache of FIG. 3.

FIG. 7 illustrates an access to data array 130 by controller 140. Again, starting with a real address 121 output from the address translation unit 62 for the memory access request, a data table index 132 is generated to select one of a plurality of entries in an L2 data table 134. In the illustrated example, a cache is shown having 64K cache lines, and thus, a 16-bit index 132.

The two MSB's of the directory index are configurable to receive either the class predict bits from class predict data structure 160, or alternatively, a pair of bits of the real address, based upon a mode signal applied to multiplexer 138. The fourteen LSB's for the index are pulled from bits 43–56 of the real address. When index 132 receives the real address bits, cache 100 is configured as an 8 MB one-way set associative cache having 64K entries. When the class predict bits are provided to the index, a 2 MB four-way set associative cache is provided. It should be appreciated that other associativities may also be supported in this manner. For example, by replacing only one class predict bit with one address bit, a two-way set associative cache could be provided. Moreover, with additional class predict bits, cache 100 may be configurable to operate a more than two different associativity modes.

Moreover, an optional multiplexer such as 4:1 multiplexer 137 may be used to select which pair of bits of the real address are provided to multiplexer 138. In this manner, the control logic for the cache may be utilized with different sizes of physical cache memory. For example, for the 16-bit index shown in FIG. 7, bits 41 and 42 are provided by multiplexer 137 as the two MSB's for the index, with bits 43–56 used as the fourteen LSB's of the index. When used with 4 MB of physical memory, bits 42 and 43 may be provided by multiplexer 137 and concatenated with bits 44–56 to provide a 15-bit directory index. Similarly, bits 43 and 44 may be provided when used with 2 MB of physical memory, and bits 44 and 45 may be provided when used with 1 MB of physical memory, thereby decreasing the width of the index, and thus, the number of entries in the data table. It should be appreciated that the number of entries in directory table 124, and thus the number of bits in directory table index 122, may also be varied in this manner so that the data table and directory have corresponding numbers of entries.

It should also be appreciated that variable size directory and data tables may also be provided to support variable size caches, e.g. depending upon the type, size and number of physical memory devices used to implement the arrays. Consequently, the number of bits supplied to the directory and data tables from the real address may be selectable to thereby vary the number of entries in each table.

Index 132 is used to retrieve a cache line 136 from table 134. Each cache line 136 is 128 bytes wide in the illustrated embodiment. The 128 bytes of information are parsed into 32-byte chunks or sublines that are sequentially transferred over the 32-byte wide interface between the L2 controller and data array controller 120. Different bus interfaces may be implemented between the arrays and the controller as desired.

Data Access Logic Flow

Figure 8A:
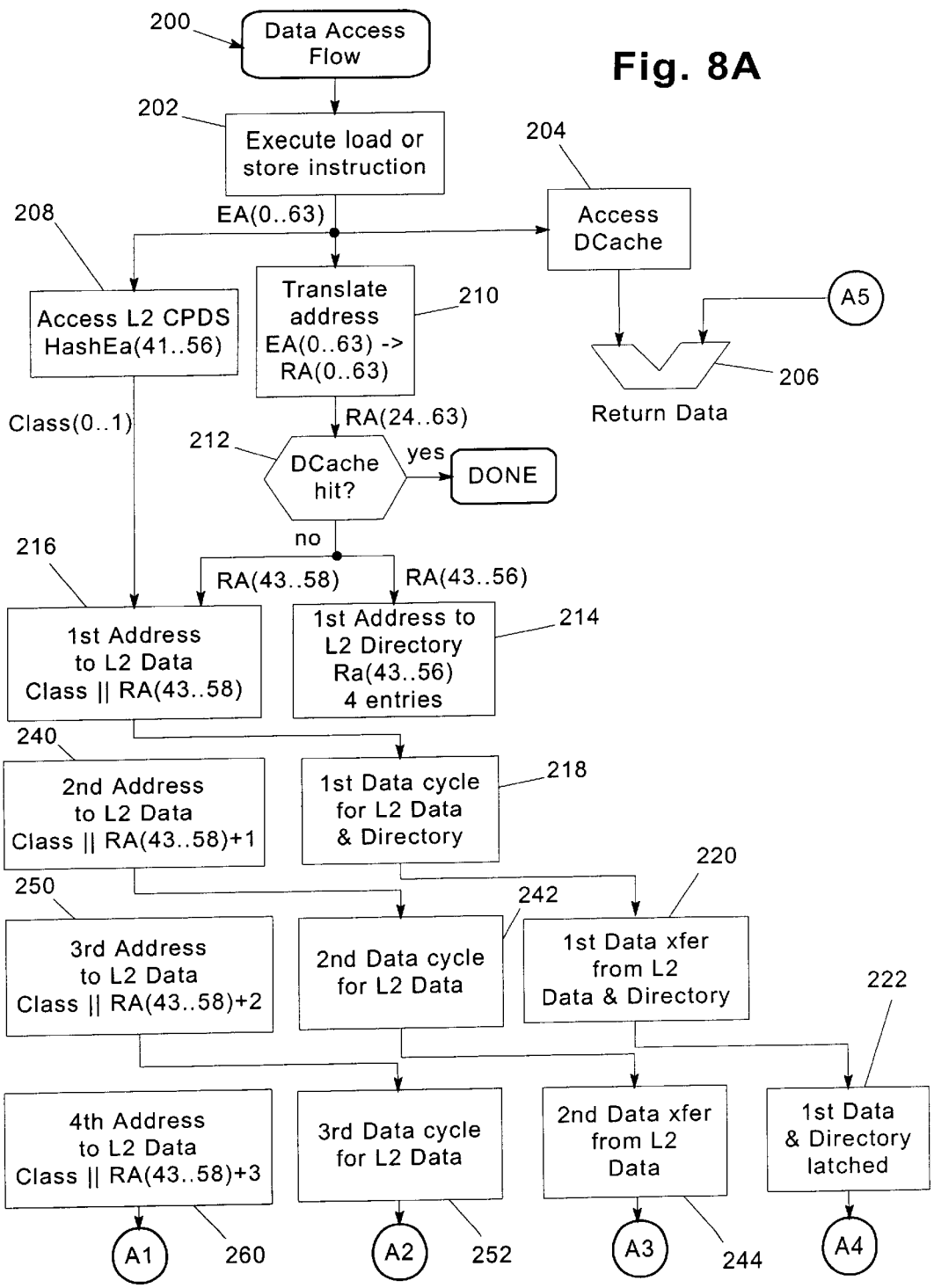
FIGS. 8A–8B are flow charts illustrating the operational flow in handling a data access request with the data processing system of FIG. 3.
Figure 8B:
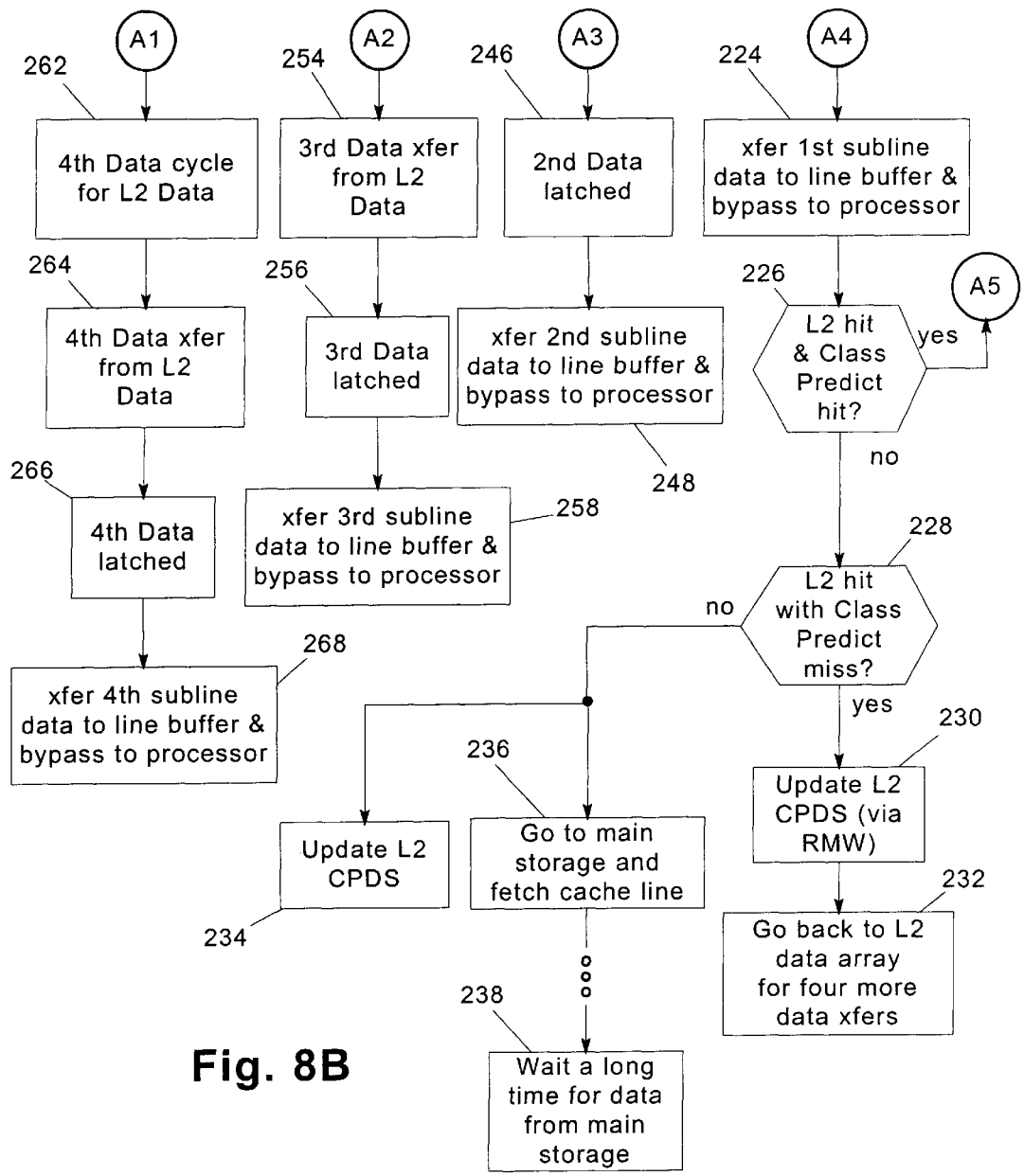

FIGS. 8A–8B illustrate a preferred logic flow 200 for handling a data access with the data processing system 50. FIGS. 8A and 8B roughly illustrate the relative timing of processes within data processing system 50, with blocks disposed in the same row executing concurrently. Moreover, except for the rows representing decisional blocks, each row generally represents a single clock cycle, with any exceptions noted below. However, it should be appreciated that the precise timing and coordination of such operations between the various components of data processing system 50 are well within the abilities of one of ordinary skill in the art.

Beginning at block 202, a load or store instruction is executed, resulting in a memory access request being output by load/store unit 56 as an effective address (EA). Access to the data cache 72 is instituted in block 204, either on the next cycle, or more typically proximate the next half-cycle.

Concurrent with the access to the data cache, access to the class predict data structure 160 is initiated in block 208, and translation of the selected memory address from an effective address to a real address is performed by address translation unit 62 in block 210. Access to the class predict data structure results in a two-bit class predict signal, while translation of the selected memory address results in a 40-bit real address.

Both functions typically complete within a single cycle, as does the access to the data cache. The remaining blocks in FIGS. 8A and 8B, starting with block 212, are then executed by L2 controller 140 to operate as described below.

First, in block 212, a hit to the data cache is determined by controller 140. If a hit has occurred, no further processing of the memory access request is required. If, however, a miss has occurred, L2 directory 120 and L2 data array 130 are accessed in blocks 214 and 216 respectively by providing addresses thereto over the dedicated buses thereto. As discussed above, directory 120 is provided with bits 43–56 of the real address, resulting in a return of a set of four directory entries. Concurrently, data array 130 is provided with bits 43–58 of the real address concatenated with the class predict bits provided by class predict data structure 160. Access to the data array is provided through a five-stage pipeline in controller 140 to reduce the access time for the four 32-byte chunks of the cache line stored at the index location in the data array.

Next, block 218 operates as a placeholder waiting for receipt of the directory entry set and the first 32-byte subline from the cache line. In the next cycle, transfer of the directory entry set and the first 32-byte subline data array begins in block 220. In the next cycle, the directory entry set and the first subline of data is latched in block 222, and in the next cycle, the first subline of data is transferred to the L1 cache as well as bypassed to the processor in block 224.

In the next cycle, depending upon the result of two queries in blocks 226 and 228, several activities can occur. First, if an L2 class predict hit and L2 hit have both occurred, indicating that the retrieved data is valid as is the class predict information, data is passed back to the L1 and the processor as represented by multiplexer block 206. If, however, an L2 hit has occurred with a class predict miss, the L2 class predict data structure 160 is updated in block 230 via a read-modify-write applied to class predict table 162 through latch 172 (FIG. 4A). Next, in block 232, a new access to the L2 data array is instituted to retrieve the correct cache line corresponding to the correct class. As discussed above with reference to FIG. 6, upon retrieval of a directory entry set, the correct class, the class predict hit or miss, and the L2 hit or miss can all be determined by the processor. Accordingly, a new access, e.g., as instituted at block 214, can be instituted to retrieve the correct cache line.

Returning to block 228, if an L2 miss occurs, blocks 234 and 236 are next executed in parallel to both update the class predict data structure based on the L2 LRU, and to institute a memory access request to main memory storage for the desired cache line. Next, as represented by block 238, controller 140 must wait several cycles (often as many as 80 cycles or more) for the appropriate cache line to be returned from main storage, whereby the cache line may be cached into the L2 cache at the least recently used (LRU) cache line for the set of corresponding directory entries. Determination of the least recently used cache line is performed utilizing the L2 MRU array information in a manner well known in the art.

Returning to block 218 in FIG. 8A, the throughput of data through controller 140 is handled through a pipeline, and accordingly, concurrent with the first data cycle for the first subline of data, a second access is initiated to the L2 data array in block 240 for the next 32-byte subline in the desired cache line. Accesses to the third and fourth sublines are instituted in subsequent cycles in blocks 250 and 260. Handling of the second, third and fourth sublines occur respectively in blocks 242–248, 252–258, and 262–268 in an identical manner to blocks 218–224. It should be appreciated, however, that if an L2 miss or L2 class predict miss is detected after retrieval of the first subline of data, the retrieved data from the second, third and fourth sublines is typically discarded.

Instruction Fetch Flow

Figure 9A:
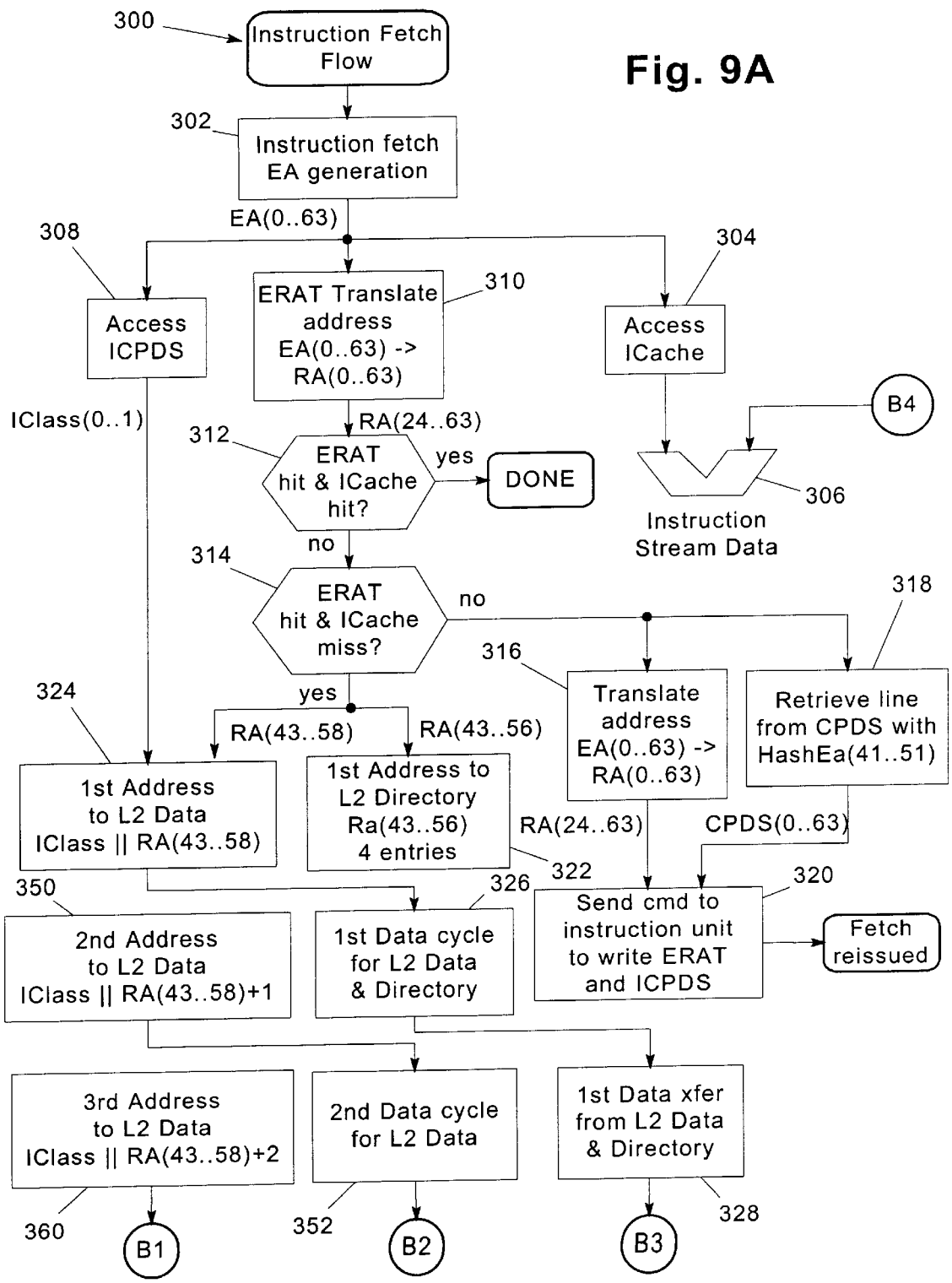
FIGS. 9A–9B are flow charts illustrating the operational flow in handling an instruction fetch request with the data processing system of FIG. 3.
Figure 9B:
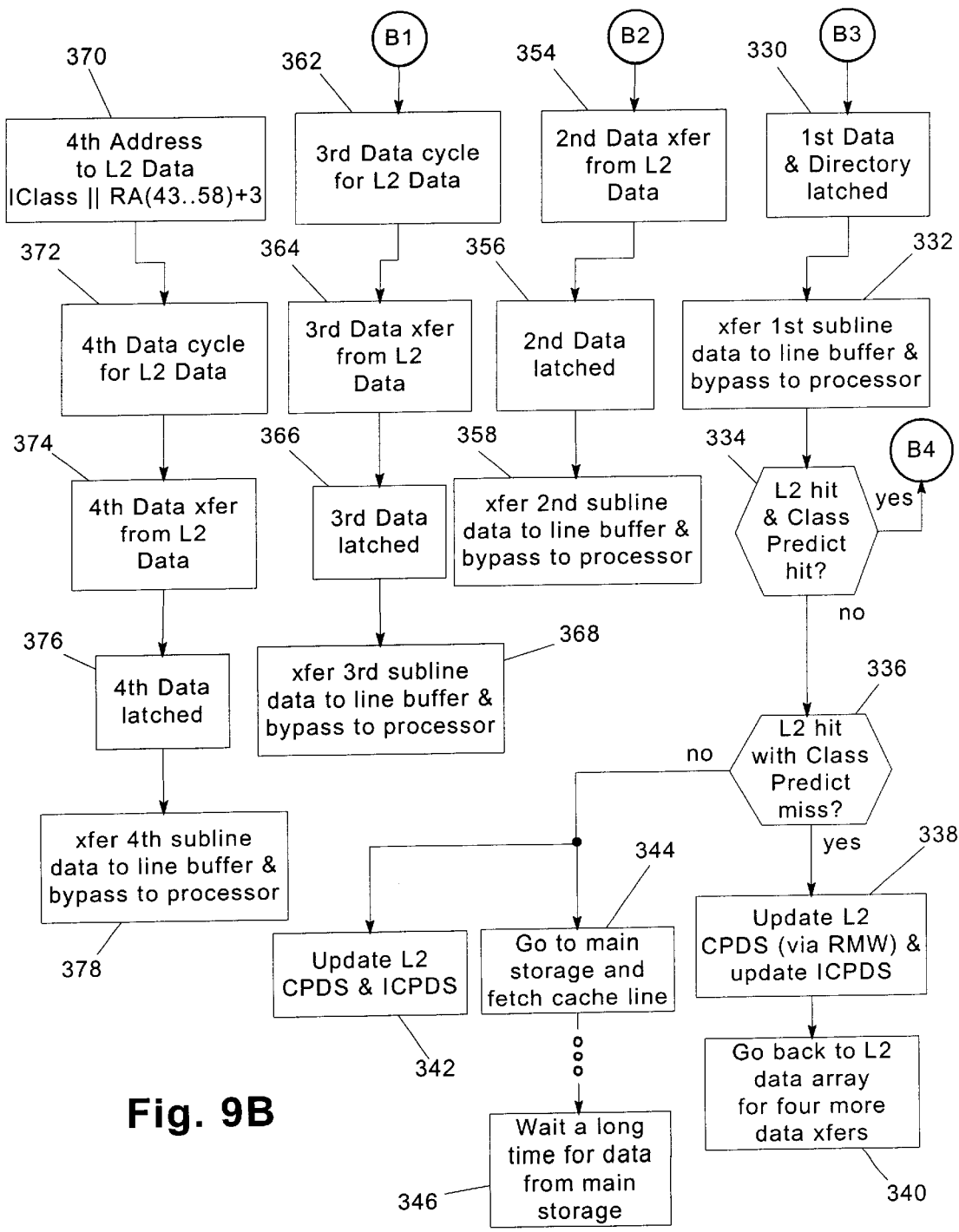

FIGS. 9A and 9B illustrate a representative program flow 300 for handling an instruction fetch operation. The previously-described illustration conventions for FIGS. 8A–8B also apply to these figures.

First, in block 302, in response to an instruction fetch request by instruction unit 58, a memory access request is generated as an effective address. The effective address is passed to instruction cache 78 as illustrated at block 304, whereby valid data, if any, is passed to the instruction stream through multiplexer block represented at 306.

Concurrently with the access to the instruction cache, the instruction class predict data structure 180 is accessed by ICPDS access unit 84 in block 308. Moreover, in block 310, ERAT access unit 86 initiates translation of the effective address to a real address using ERAT unit 88. Upon completion of blocks 308 and 310, a predicted class from the instruction class predict data structure (represented by IClass) and a 40-bit real address, are available to L2 cache controller 140.

Handling of a memory access request by controller 140 is initiated in block 312, where it is determined whether an ERAT hit and ICache hit both occurred. If so, the memory access request has been handled by the instruction cache, and processing by the cache controller 140 is not required. If not, however, block 314 determines whether an ERAT hit has occurred with an instruction cache miss. If not, an ERAT miss has occurred, indicating that no translation entry for the effective address was present in the ERAT unit. Accordingly, in block 316, the effective addressed is passed to the master address translate unit 62 for conversion to a real address.

Concurrently, in block 318, the master class predict data structure 160 is accessed to retrieve a new predict entry into latch 172 (FIG. 4A). In the next cycle, the real address and class predict data structure predict entry are written to the ERAT unit and ICPDS in block 320. Moreover, a command is sent to instruction unit 58 to request that the fetch be reissued. Upon reissue of the instruction fetch (handled beginning at block 302), corresponding class predict information and translation information for the effective address will then be present in the ICPDS and ERAT translate units respectively. In the alternative, it may be possible to initiate access to the L2 cache using the information retrieved from the master address translation unit and class predict data structure.

One advantage of the organization of CPDS 160 and ICPDS 180 is that retrieval of a new predict entry into the ICPDS retrieves class predict information for a 4 KB cache page. Since a high likelihood exists that subsequent instruction fetches may refer to information in the same cache page, the retrieval of an entire predict entry therefore anticipates additional L1 misses in the near future for improved performance of the L2 cache.

Returning to block 314, if an ERAT hit occurs in conjunction with an instruction cache miss, the real address is provided to the L2 directory and data arrays in blocks 322 and 324 in much the same manner as blocks 214 and 216 of FIG. 8A. Access of the directory entry set and the first subline of the cache line then proceeds in blocks 326–332 in the same manner as blocks 218–224 of FIG. 8A. Moreover, the second, third and fourth sublines of the cache lines are retrieved through the data pipe in blocks 350–358, 360–368, and 370–378, respectively. The retrieval of the second, third and fourth sublines starting at blocks 350, 360 and 370 also proceed in an identical manner to the corresponding blocks 240–248, 250–258 and 260–268 illustrated in FIGS. 8A and 8B.

In addition, handling of the L2 and class predict hit/miss signals generated by block 143 of FIG. 6 proceeds in a similar manner to the data access program flow. Specifically, block 334 passes the instruction stream data retrieved from the cache line through multiplexer block 306 in response to an L2 hit and class predict hit. If an L2 hit occurs with a class predict miss, block 336 passes control to blocks 338 and 340 to update the L2 CPDS via a read-modify-write and to request four more data transfers to retrieve the cache line corresponding to the correct class, similar to the program flow in blocks 230 and 232 of FIG. 8B. Block 338 also updates the ICPDS concurrently with the update to the master CPDS, in the manner described above.

In response to an L2 miss, blocks 342–346 concurrently update the L2 CPDS and fetch the cache line from main storage similar to blocks 234–238 of FIG. 8B. Moreover, block 342 updates the L2 ICPDS concurrently with the update to the CPDS, in the manner described above.

It should be appreciated that the above-described program flows may be implemented in any number of manners known in the art. In particular, the above-described program flows represent 5111 logic (five cycles for the first memory access and one cycle for each access thereafter), whereby the access penalty for an L1 cache miss with an L2 cache hit is five cycles. A class predict miss in the L2 cache with an L2 hit results in an additional six cycle penalty.

Other timing layouts, e.g. 411, 611, 722, 622, etc. may also be utilized in the alternative, and thus, different data cycles and associated stages therefor may be utilized in L2 controller 140. It should be appreciated that implementation of the program flows within an integrated circuit is well within the capabilities of one of ordinary skill in the art.

Various modifications may be made to the illustrated embodiments without departing from the spirit and scope of the invention. Therefore, the invention lies solely in the claims hereinafter appended.

What is claimed is:

1. A data processing system, comprising:
   (a) a memory configured to store information at a plurality of memory addresses;
   (b) a processor configured to issue a memory access request for information referenced by a selected memory address;
   (c) a first cache coupled to the processor and the memory and configured to cache a first portion of information from the memory, the first cache including a first cache directory including a plurality of first cache directory entries;
   (d) a second cache coupled to the processor and configured as a multi-way set associative cache that caches a second portion of information from the memory, the second cache including a second cache directory including a plurality of second cache directory entries, each of which is associated with one of a plurality of classes, wherein the selected memory address is related to a set of corresponding second cache directory entries respectively associated with the plurality of classes;
   (e) a class predict data structure separate from the first cache directory and including a plurality of predict entries of predicted classes, at least one of the plurality of predict entries including a predicted class for the set of corresponding second cache directory entries related to the selected memory address, wherein the class predict data structure comprises a class predict table including a plurality of table entries, each including a plurality of array elements, each array element associated with a different one of the plurality predict entries;
   (f) a first access unit configured to initiate an access to the class predict data structure during processing of the memory access request by the first cache to determine the predicted class for the set of corresponding second cache directory entries related to the selected memory address; and
   (g) a second access unit configured to access the corresponding second cache directory entry associated with the predicted class from the set of corresponding second cache directory entries to determine a cache hit or miss for the selected memory address.

2. The data processing system of claim 1, wherein the second cache further includes a plurality of cache lines, each configured to store a cached copy of a selected portion of information from the memory, and each associated with one of the plurality of second cache directory entries, and wherein the second access unit is further configured to access the cache line associated with the second cache directory entry associated with the predicted class for the selected memory address.

3. The data processing system of claim 2, wherein the first cache is a level one cache, and wherein the second cache is a level two cache.

4. The data processing system of claim 3, wherein the processor, the first cache, and the first and second access units are disposed in a processor integrated circuit device.

5. The data processing system of claim 4, wherein the plurality of cache lines are disposed in at least one memory device external to the processor integrated circuit device.

6. The data processing system of claim 5, wherein the at least one memory device comprises a static random access memory (SRAM) device.

7. The data processing system of claim 4, further comprising first and second cache controllers disposed in the processor integrated circuit device, wherein the first and second access units are respectively integrated into the first and second cache controllers.

8. The data processing system of claim 4, wherein the cache predict data structure is disposed in the processor integrated circuit device.

9. The data processing system of claim 2, wherein the plurality of predict entries in the class predict data structure are addressed by the selected memory address, wherein the first cache is accessed by a first addressing format and the second cache directory in the second cache is addressed by a second addressing format, wherein the processor issues the memory access request in the first addressing format, wherein the data processing system further includes an address translator configured to translate the first addressing format to the second addressing format, and wherein the class predict data structure is configured to receive the selected memory address in the first addressing format.

10. The data processing system of claim 9, wherein the address translator is configured to complete translation of the selected memory address to the second addressing format, and the first access unit is configured to determine the predicted class for the set of corresponding second cache directory entries related to the selected memory address, as of completion of the processing of the memory access request by the first cache, and wherein the second access unit is configured to immediately initiate an access to the cache line associated with the second cache directory entry associated with the predicted class for the selected memory address upon determination of a cache miss in the first cache.

11. The data processing system of claim 9, wherein the processor includes a load/store unit and an instruction unit, and the first cache includes a data cache associated with the load/store unit and an instruction cache associated with the instruction unit, wherein the address translator is a first address translator associated with the load/store unit, wherein the data processing system further comprises a second address translator associated with the instruction unit and configured to translate an instruction fetch request from the instruction unit from the first addressing format to the second addressing format, wherein the class predict data structure is a first class predict data structure associated with the load/store unit, and the data processing system further comprising an instruction class predict data structure associated with the instruction unit.

12. The data processing system of claim 11, wherein the first class predict data structure is a master data structure, and wherein the instruction class predict data structure is a slave data structure including copies of a subset of the plurality of predict entries from the first class predict data structure, wherein the first access unit is configured to update the instruction class predict data structure whenever one of the predict entries in the subset is updated in the first class predict data structure.

13. The data processing system of claim 12, wherein the first access unit is configured to update a sub-array of predict entries at a time, the subarray of predict entries corresponding to a page of cache lines.

14. The data processing system of claim 12, wherein the first access unit is configured to update the instruction class predict data structure in response to a translation miss in the second address translator.

15. The data processing system of claim 9, wherein the first addressing format is a virtual address format, and wherein the second addressing format is a real address format.

16. The data processing system of claim 2, wherein the plurality of predict entries in the class predict data structure are addressed by the selected memory address.

17. The data processing system of claim 16, wherein, in response to a class predict miss, the second access unit is further configured to determine a correct class for the selected memory address and signal the first access unit to update the predict entry associated with the selected memory address with the correct class.

18. The data processing system of claim 17, wherein the second access unit is further configured to concurrently retrieve each second cache directory entry from the set of corresponding second cache directory entries, and to determine the correct class by comparing a tag for the selected memory address with a tag for each second cache directory entry from the set of corresponding second cache directory entries.

19. The data processing system of claim 17, wherein the selected memory address is defined by a plurality of address bits partitioned into first and second sets, wherein the class predict data structure further includes a hash mechanism configured to map the selected memory address to a matching one of the plurality of table entries by applying a hashing algorithm to the first set of address bits, and to select a matching one of the array elements in the matching table entry using the second set of address bits.

20. The data processing system of claim 17, wherein the second access unit is configured to, in response to a class predict miss or a second cache miss, update all of the array elements in the table entry associated with the predict entry associated with the selected memory address.

21. The data processing system of claim 16, wherein the class predict data structure is a master data structure including a plurality of array elements, each associated with one of the plurality of predict entries, wherein the processor includes a plurality of memory access request sources, and wherein the data processing system further includes at least one slave class predict data structure associated with at least one of the plurality of memory access request sources, the slave class predict data structure including an access port permitting access thereto by the at least one of the plurality of memory access request sources, the slave class predict data structure maintaining a copy of at least a portion of the plurality of array elements in the master data structure.

22. The data processing system of claim 21, wherein the master data structure is partitioned into a plurality of sub-arrays, each of which including a portion of the plurality of array elements, the slave class predict data structure maintaining a read-only copy of at least a portion of the plurality of sub-arrays, wherein the second access unit is configured to, in response to a class predict miss or a second cache miss, update all of the array elements in the sub-array associated with the predict entry associated with the selected memory address.

23. An integrated circuit device, comprising:
(a) a processor configured to issue a memory access request for information referenced by a selected memory address;
(b) a memory port coupled to the processor and adapted to communicate with an external memory that stores information at a plurality of memory addresses;
(c) a first cache coupled to the processor and configured to cache a first portion of information from the external memory, the first cache including a first cache directory including a plurality of first cache directory entries;
(d) a second cache coupled to the processor and configured as a multi-way set associative cache that caches a second portion of information from the external memory, the second cache including a cache port adapted to communicate with an external second cache directory including a plurality of second cache directory entries, each of which is associated with one of a plurality of classes, wherein the selected memory address is related to a set of corresponding second cache directory entries respectively associated with the plurality of classes;
(e) a class predict data structure separate from the first cache directory and including a plurality of predict entries of predicted classes, at least one of the plurality of predict entries including a predicted class for the set of corresponding second cache directory entries related to the selected memory address, wherein the class predict data structure comprises a class predict table including a plurality of table entries, each including a plurality of array elements, each array element associated with a different one of the plurality of predict entries;
(f) a first access unit configured to initiate an access to the class predict data structure during processing of the memory access request by the first cache to determine the predicted class for the set of corresponding second cache directory entries related to the selected memory address; and
(g) a second access unit configured to access the cache port to retrieve the corresponding second cache directory entry associated with the predicted class from the set of corresponding second cache directory entries to determine a cache hit or miss for the selected memory address.

24. A method of accessing information referenced by a selected memory address in a data processing system of the type including first and second caches coupled to a processor, the first cache including a first cache directory including a plurality of first cache directory entries, the second cache comprising a multi-way set associative cache of the type including a plurality of second cache directory entries, each of which is associated with one of a plurality of classes, wherein the selected memory address is related to a set of corresponding second cache directory entries respectively associated with the plurality of classes in the multi-way set associative cache, the method comprising;
(a) concurrently with accessing the first cache, initiating an access to a class predict data structure to determine a predicted class for the set of corresponding second cache directory entries related to the selected memory address, wherein the class predict data structure is separate from the first cache directory and includes a plurality of predict entries of predicted classes, and wherein the class predict data structure comprises a class predict table including a plurality of table entries, each including a plurality of array elements, each array element associated with a different one of the plurality of predict entries; and (b) in response to a cache miss in the first cache, determining a cache hit or miss in the second cache using the corresponding second cache directory entry associated with the predicted class for the set of corresponding second cache directory entries.

25. The method of claim 24, wherein the second cache further includes a plurality of cache lines, each configured to store a cached copy of a selected portion of information from the memory, and each associated with one of the plurality of second cache directory entries, the method further comprising accessing the cache line associated with the second cache directory entry associated with the predicted class for the selected memory address.

26. The method of claim 25, wherein the plurality of predict entries in the class predict data structure are addressed by the selected memory address, wherein the first cache is accessed by a first addressing format and the second cache directory in the second cache is addressed by a second addressing format, wherein the processor issues the memory access request in the first addressing format, and wherein the class predict data structure is configured to receive the selected memory address in the first addressing format, the method further comprising concurrently with accessing the first cache and initiating the access to the class predict data structure, translating the memory access request from the first addressing format to the second addressing format.

27. The method of claim 25, wherein the plurality of predict entries in the class predict data structure are addressed by the selected memory address, the method further comprising, in response to a class predict miss:

(a) determining a correct class for the selected memory address; and (b) updating the predict entry associated with the selected memory address with the correct class.

28. The method of claim 27, further comprising:

(a) concurrently retrieving each second cache directory entry from the set of corresponding cache directory entries; and (b) determining the correct class by comparing a tag for the selected memory address with a tag for each second cache directory entry from the set of corresponding second cache directory entries.

29. The method of claim 25, wherein the selected memory address is defined by a plurality of address bits partitioned into first and second sets, wherein initiating the access to the class predict data structure includes:

(a) applying a hashing algorithm to the first set of address bits of the selected memory address to select a matching one of the plurality of table entries; and (b) selecting a matching one of the array elements in the matching table entry using the second set of address bits.

30. The method of claim 25, further comprising, in response to a class predict miss or a second cache miss, updating all of the array elements in the table entry associated with the predict entry associated with the selected memory address.

31. The method of claim 25, wherein the plurality of predict entries in the class predict data structure are addressed by the selected memory address, wherein the class predict data structure is a master data structure including a plurality of array elements, each associated with one of the plurality of predict entries, wherein the processor includes a plurality of memory access request sources, and wherein the data processing system further includes at least one slave class predict data structure associated with at least one of the plurality of memory access request sources, the slave class predict data structure including an access port permitting access thereto by the at least one of the plurality of memory access request sources, the method further comprising maintaining in the slave data structure a copy of at least a portion of the plurality of array elements from the master data structure.

32. The method of claim 31, wherein the master data structure is partitioned into a plurality of sub-arrays, each of which including a portion of the plurality of array elements, wherein maintaining the slave class predict data structure includes maintaining a read-only copy of at least a portion of the plurality of sub-arrays, the method further comprising, in response to a class predict miss or a second cache miss, updating all of the array elements in the sub-array associated with the predict entry associated with the selected memory address.

33. A data processing system, comprising:

(a) a memory configured to store information at a plurality of memory addresses;

(b) a processor configured to issue a memory access request for information referenced by a selected memory address defined by a plurality of address bits;

(c) a cache coupled to the processor and configured as a multi-way set associative cache that caches a portion of information from the memory, the cache including a cache directory including a plurality of cache directory entries, each of which is associated with one of a plurality of classes, wherein the selected memory address is related to a set of corresponding cache directory entries respectively associated with the plurality of classes;

(d) a class predict array including a plurality of predict array elements storing predicted classes, the class predict array partitioned into a plurality of sub-arrays, each of which including a portion of the plurality of predict array elements, wherein one of the predict array elements includes a predicted class for the set of corresponding cache directory entries related to the selected memory address; and (e) an access unit configured to initiate an access to the class predict array to determine the predicted class for the set of corresponding cache directory entries related to the selected memory address, the access unit configured to apply a hashing algorithm to a first set of the plurality of address bits for the selected memory address to select a matching one of the plurality of sub-arrays, and to select a matching one of the predict array elements from the matching sub-array using a second set of the plurality of address bits for the selected memory address.

34. The data processing system of claim 33, wherein the cache is a four-way set associative cache, wherein each predict array element includes two bits, wherein each sub-array includes thirty two predict array elements such that each sub-array forms a sixty four-bit word.

35. The data processing system of claim 34, wherein the hashing algorithm includes performing an exclusive-or operation on selected bits from the selected memory address.

36. A data processing system, comprising:

(a) a memory configured to store information at a plurality of memory addresses;

(b) at least one memory access request source configured to issue a memory access request for information referenced by a selected memory address;

(c) a cache coupled to the memory access request source and configured as a multi-way set associative cache that caches a portion of information from the memory, the cache including a cache directory including a plurality of cache directory entries, each of which is associated with one of a plurality of classes, wherein the selected memory address is related to a set of corresponding cache directory entries respectively associated with the plurality of classes;

(d) a master class predict data structure including a plurality of predict entries of predicted classes, one of which including a predicted class for the set of corresponding cache directory entries related to the selected memory address;

(e) at least one slave class predict data structure associated with the memory access request source, the slave class predict data structure including an access port permitting read access thereto, the slave class predict data structure maintaining a copy of at least a portion of the plurality of predict entries in the master data structure; and (f) an access unit configured to initiate an access to the slave class predict data structure through the access port to determine the predicted class for the set of corresponding cache directory entries related to the selected memory address.

37. The data processing system of claim 36, wherein the master and slave data structures each include a plurality of array elements, each associated with one of the plurality of predict entries, wherein the master and slave data structures are each partitioned into a plurality of sub-arrays, each of which including a portion of the plurality of array elements.

38. The data processing system of claim 37, further comprising a second access unit configured to, in response to a class predict miss or a cache miss, update all of the array elements in the sub-array in the master class predict data structure associated with the predict entry associated with the selected memory address.

39. The data processing system of claim 38, wherein the slave class predict data structure is configured to maintain a copy of the sub-arrays, and wherein the second access unit is further configured to, in response to an update to a selected sub-array in the master class predict data structure, update the corresponding sub-array in the slave class predict data structure.

40. The data processing system of claim 36, further comprising a second memory access request source configured to issue a second memory access request for information referenced by a second selected memory address.

41. The data processing system of claim 40, wherein the master class predict data structure is associated with the second memory access request source and includes an access port permitting read access thereto.

42. The data processing system of claim 40, further comprising a second slave class predict data structure associated with the second memory access request source, the second slave class predict data structure including an access port permitting read access thereto.

43. The data processing system of claim 40, wherein the first memory access request source is an instruction fetch unit of a processor, and wherein the second memory access request source is a load/store unit of the processor.

44. A data processing system, comprising:
(a) a memory configured to store information at a plurality of memory addresses;

(b) a processor configured to issue a memory access request for information referenced by a selected memory address defined by a plurality of bits;

(c) a cache coupled to the processor and configured to cache a portion of information from the memory, the cache further configurable to operate in one of first and second modes, the cache configured to operate as an n-way set associative cache in the first mode and as an m-way set associative cache in the second mode;

(d) a class predict data structure including a plurality of predict entries of predicted classes, one of which including a predicted class for the selected memory address, the class predict data structuring outputting at least one class predict bit;

(e) a cache data array including a plurality of cache lines accessed via an index, the index defined by a plurality of bits, wherein, in the first mode, each cache line is associated with one of n classes, and, in the second mode, each cache line is associated with one of m classes;

(f) a first access unit configured to initiate an access to the class predict data structure to retrieve the class predict bit for the selected memory address; and (g) a second access unit configured to generate the index to the cache data array for the selected memory address, wherein, in the first mode, the second access unit generates the index with a selected bit in the plurality of bits set to the value of the class predict bit, and in the second mode, the second access unit generates the index with the selected bit set to the value of a predetermined one of the plurality of bits in the selected memory address.

45. The data processing system of claim 44, wherein the second access unit includes a multiplexer having first and second inputs, a control input, and an output, the first input configured to receive the class predict bit from the class predict data structure, the second input configured to receive the predetermined bit in the selected memory address, the control input configured to receive a mode selection signal, and the output configured generate the selected bit for the index.

46. The data processing system of claim 45, wherein, in the first mode, the cache is configured to operate as a four-way set associative class, and in the second mode, the cache is configured to operate as a one-way set associative class, wherein the index includes two selected bits, and wherein the class predict data structure outputs two class predict bits predicting one of four classes for the selected memory address.

47. A data processing system, comprising:
(a) a memory configured to store information at a plurality of memory addresses;

(b) a processor configured to issue a memory access request for information referenced by a selected memory address;

(c) a first cache coupled to the processor and the memory and configured to cache a first portion of information from the memory, the first cache including a first cache directory including a plurality of first cache directory entries;

(d) a second cache coupled to the processor and configured as a multi-way set associative cache that caches a second portion of information from the memory, the second cache including a second cache directory including a plurality of second cache directory entries, each of which is associated with one of a plurality of classes, wherein the selected memory address is related to a set of corresponding second cache directory entries respectively associated with the plurality of classes;

(e) a class predict data structure separate from the first cache directory and including a plurality of predict entries of predicted classes, at least one of the plurality of predict entries including a predicted class for the set of corresponding second cache directory entries related to the selected memory address, wherein the number of predict entries in the class predict data structure is greater than the number of first cache directory entries in the first cache directory, and wherein the class predict data structure comprises a class predict table including a plurality of table entries, each including a plurality of array elements, each array element associated with a different one of the plurality of predict entries;

(f) a first access unit configured to initiate an access to the class predict data structure during processing of the memory access request by the first cache to determine the predicted class for the set of corresponding second cache directory entries related to the selected memory address; and (g) a second access unit configured to access the corresponding second cache directory entry associated with the predicted class from the set of corresponding second cache directory entries to determine a cache hit or miss for the selected memory address.

* * * * *